US012715462B2

(12) United States Patent
Fuke et al.

(10) Patent No.: US 12,715,462 B2
(45) Date of Patent: Aug. 25, 2026

(54) INFORMATION PROCESSING DEVICE, INFORMATION PROCESSING METHOD, AND RECORDING MEDIUM STORING PROGRAM

(71) Applicant: TOYOTA JIDOSHA KABUSHIKI KAISHA, Toyota (JP)

(72) Inventors: Jumpei Fuke, Toyota (JP); Kuniharu Tsuzuki, Handa (JP); Shota Honda, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 207 days.

(21) Appl. No.: 17/900,294

(22) Filed: Aug. 31, 2022

(65) Prior Publication Data

US 2023/0107961 A1 Apr. 6, 2023

(30) Foreign Application Priority Data

Sep. 28, 2021 (JP) ................................ 2021-158414

(51) Int. Cl.
*B60W 50/10* (2012.01)
*B60W 50/14* (2020.01)

(52) U.S. Cl.
CPC ............ *B60W 50/10* (2013.01); *B60W 50/14* (2013.01); *B60W 2050/146* (2013.01)

(58) Field of Classification Search
CPC ................ B60W 50/10; B60W 50/14; B60W 2050/146; G07C 2009/00555; G07C 2009/00547; G07C 2209/08; G07C 9/00309; B60R 25/24
USPC ............................................................ 701/1
See application file for complete search history.

(56) References Cited

U.S. PATENT DOCUMENTS 8,482,382 B2 * 7/2013 Lickfelt .................. B60R 25/04 340/5.63
9,646,436 B1 * 5/2017 Campbell .......... G07C 9/00309
2005/0096009 A1 5/2005 Ackley
2009/0224876 A1 * 9/2009 McCall ............. G07C 9/00309 340/7.38

(Continued)

FOREIGN PATENT DOCUMENTS

CN 110636168 A 12/2019
CN 110936919 A 3/2020

(Continued)

*Primary Examiner* — Matthias S Weisfeld
*Assistant Examiner* — Preston Jay Miller
(74) *Attorney, Agent, or Firm* — Oliff PLC

(57) ABSTRACT

An information processing device includes: a reception section that receives, from a user, setting processing for setting a time at which control of a vehicle using the information processing device is suppressed; and a transmission section that: in a case in which a first signal is received from the vehicle at a different time from the time at which control of the vehicle is suppressed, and in response to the information processing device vibrating or moving, transmits a second signal configured to enable control of the vehicle to be permitted, and in a case in which the first signal is received from the vehicle at the time at which control of the vehicle is suppressed, regardless of whether or not the information processing device is vibrating or moving, does not transmit the second signal.

14 Claims, 13 Drawing Sheets

(56) References Cited

U.S. PATENT DOCUMENTS

| | | | | |
|---|---|---|---|---|
| 2010/0039215 | A1* | 2/2010 | Proefke | B60R 25/24 340/5.1 |
| 2014/0129051 | A1* | 5/2014 | Gautama | H04W 4/40 701/2 |
| 2014/0368313 | A1* | 12/2014 | Seiberts | G07C 9/00309 340/5.61 |
| 2015/0116100 | A1* | 4/2015 | Yang | G07C 9/29 340/426.3 |
| 2017/0158168 | A1* | 6/2017 | Nantz | B60R 25/24 |
| 2017/0160786 | A1* | 6/2017 | Ji | G07C 9/00309 |
| 2017/0282856 | A1* | 10/2017 | Riedel | B60R 25/24 |
| 2017/0349142 | A1* | 12/2017 | Krishnan | B60R 25/24 |
| 2017/0352206 | A1* | 12/2017 | Nagata | G07C 9/00309 |
| 2019/0338562 | A1* | 11/2019 | Koya | G07C 9/00309 |
| 2019/0385392 | A1* | 12/2019 | Cho | G07C 9/00309 |
| 2019/0389428 | A1* | 12/2019 | Liu | B60R 25/246 |
| 2020/0094779 | A1 | 3/2020 | Hiruta et al. | |
| 2020/0219338 | A1* | 7/2020 | Chen | B60R 25/002 |
| 2020/0351665 | A1* | 11/2020 | Kelly | B60R 25/24 |
| 2022/0198856 | A1* | 6/2022 | Sobue | H04W 4/40 |
| 2022/0355801 | A1* | 11/2022 | Jeon | B60W 50/0097 |

FOREIGN PATENT DOCUMENTS

| | | | | |
|---|---|---|---|---|
| DE | 102014204111 | A1 * | 9/2014 | B60R 25/00 |
| JP | 2007-509512 | A | 4/2007 | |
| JP | 2017-160703 | A | 9/2017 | |
| JP | 2017-220759 | A | 12/2017 | |
| JP | 2020-176442 | A | 10/2020 | |
| JP | 2021-010087 | A | 1/2021 | |

* cited by examiner

FIG.6

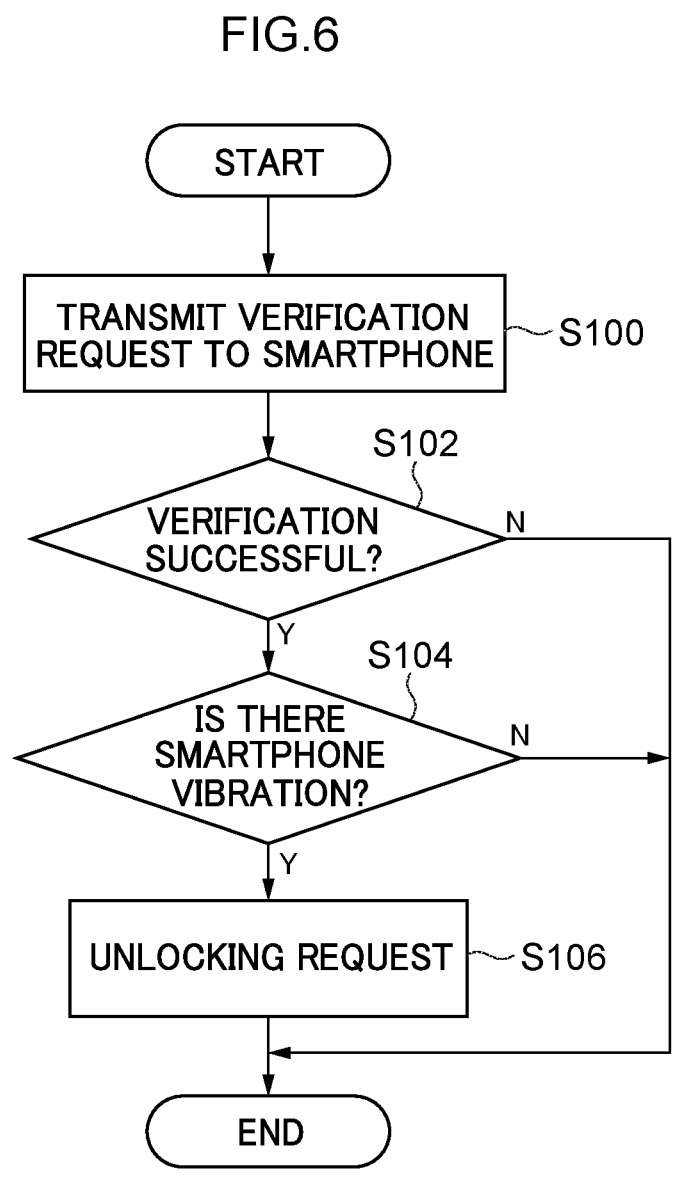

START
TRANSMIT VERIFICATION REQUEST TO SMARTPHONE S100
S102 VERIFICATION SUCCESSFUL?
N
Y
S104 IS THERE SMARTPHONE VIBRATION?
N
Y
UNLOCKING REQUEST S106
END

FIG.10

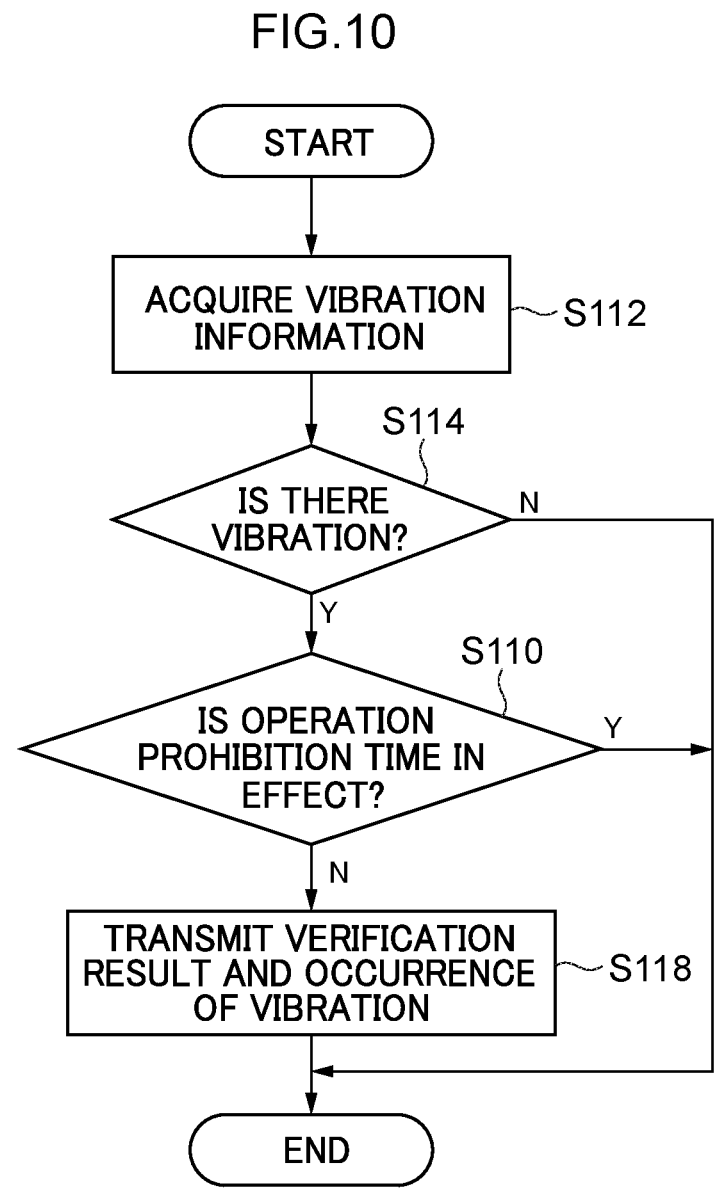

START
ACQUIRE VIBRATION INFORMATION S112
S114 IS THERE VIBRATION? N Y
S110 IS OPERATION PROHIBITION TIME IN EFFECT? Y N
TRANSMIT VERIFICATION RESULT AND OCCURRENCE OF VIBRATION S118
END

FIG.11

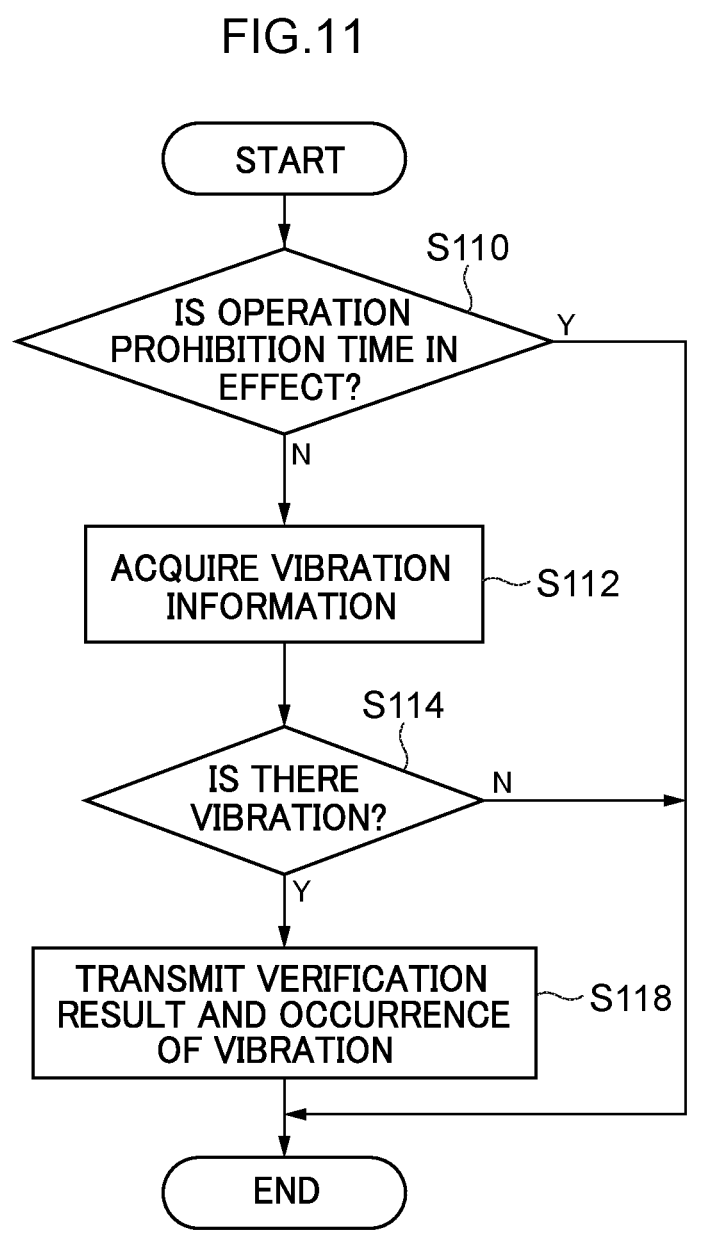

START
S110
IS OPERATION PROHIBITION TIME IN EFFECT?
Y
N
ACQUIRE VIBRATION INFORMATION
S112
S114
IS THERE VIBRATION?
N
Y
TRANSMIT VERIFICATION RESULT AND OCCURRENCE OF VIBRATION
S118
END

INFORMATION PROCESSING DEVICE, INFORMATION PROCESSING METHOD, AND RECORDING MEDIUM STORING PROGRAM

CROSS-REFERENCE TO RELATED APPLICATION

This application is based on and claims priority under 35 USC 119 from Japanese Patent Application No. 2021-158414 filed on Sep. 28, 2021, the disclosure of which is incorporated by reference herein.

BACKGROUND

Technical Field

The present disclosure relates to an information processing device, an information processing method, and a program.

Related Art

Japanese Patent Application Laid-open No. 2017-160703 discloses an electronic key system that rejects a verification request from a vehicle in a case in which vibration of a smart key is not detected. In order to ensure successful authentication, this electronic key system requires that a portable device has not been idle for a fixed period of time, and it is possible to prevent an unintended mistaken operation by a user in a case in which the portable device is not moved for a long time, such as during storage of the vehicle or the portable device.

In cases in which a smartphone having a digital key registered thereon is provided with similar functionality, because smartphones may be used more frequently in the home, there are concerns that it will not be possible to obtain the effect of preventing mistaken operation in an equivalent manner to a smart key.

SUMMARY

An object of the present disclosure is to suppress mistaken operation of an information processing device used to control a vehicle.

In a first aspect, an information processing device includes: a reception section that receives, from a user, setting processing for setting a time at which control of a vehicle using the information processing device is suppressed; and a transmission section that: in a case in which a first signal is received from the vehicle at a different time from the time at which control of the vehicle is suppressed, and in response to the information processing device vibrating or moving, transmits a second signal configured to enable control of the vehicle to be permitted, and in a case in which the first signal is received from the vehicle at the time at which control of the vehicle is suppressed, regardless of whether or not the information processing device is vibrating or moving, does not transmit the second signal.

In the information processing device of the first aspect, the reception section receives, from the user, setting processing for setting a time period during which control of the vehicle using the information processing device is suppressed. Further, in a case in which the transmission section has received the first signal from the vehicle at a time that is different from the time during which control of the vehicle is suppressed, a second signal is transmitted to enable control of the vehicle to be permitted in response to vibration or movement of the information processing device. In a case in which the transmission section has received the first signal from the vehicle within a time period in which control of the vehicle is suppressed, regardless of whether or not the information processing device is vibrating or moving, the second signal is not transmitted. Here, “control of a vehicle using the information processing device” refers to a functionality that controls the vehicle via operations using an information processing device, such as locking and unlocking of an opening/closing section, turning on a power source, and starting an engine. According to this information processing device, mistaken operation of an information processing device used to perform control of a vehicle can be suppressed.

An information processing device of a second aspect is the information processing device of the first aspect, in which the transmission section, in a case in which the first signal is received from the vehicle at a different time from the time at which control of the vehicle is suppressed, and in response to the information processing device not vibrating or moving, transmits a third signal for suppressing control of the vehicle.

In the information processing device of the second aspect, in a case in which the transmission section has received the first signal from the vehicle at a different time from a time during which control of the vehicle is suppressed, and in response to the information processing device not vibrating or moving, a third signal for suppressing control of the vehicle is transmitted. According to this information processing device, mistaken operation of an information processing device used to perform control of a vehicle can be effectively suppressed.

An information processing device of a third aspect is the information processing device of the second aspect, in which the transmission section, in a case in which the first signal is received from the vehicle at the time at which control of the vehicle is suppressed, regardless of whether or not the information processing device is vibrating or moving, transmits the third signal for suppressing control of the vehicle.

In the information processing device of the third aspect, in a case in which the transmission section has received the first signal from the vehicle within the time period during which control of the vehicle is suppressed, regardless of whether or not the information processing device is vibrating or moving, the third signal for suppressing control of the vehicle is transmitted. According to this information processing device, mistaken operation of an information processing device used to perform control of a vehicle can be effectively suppressed.

An information processing device of a fourth aspect is the information processing device of any of the first to third aspects, further including a notification section that, in a case in which the first signal is received from the vehicle at the time at which control of the vehicle is suppressed, reports that it is the time at which control of the vehicle is suppressed.

In the information processing device of the fourth aspect, in a case in which the notification section has received the first signal from the vehicle within the time period during which control of the vehicle is suppressed, the notification section reports that the time period during which control of the vehicle is suppressed is ongoing. According to this information processing device, a user who has attempted to control a vehicle using the information processing device can be notified that the current time is within the period during which control of the vehicle is suppressed.

An information processing device of a fifth aspect includes a display that displays a screen configured to enable a user to perform setting processing for setting a time at which control of a vehicle using the information processing device is suppressed, and a reception unit that receives settings according to the setting processing from the user.

In the information processing device of the fifth aspect, the display unit displays a screen to enable the user to perform setting processing for setting a time period during which control of the vehicle using the information processing device is suppressed. The reception unit receives settings from the user according to the setting processing. According to this information processing device, mistaken operation of an information processing device used to perform control of a vehicle can be suppressed.

An information processing device of a sixth aspect is the information processing device of the fifth aspect, in which the setting processing is for setting one of activation or deactivation of a setting of the time at which control of the vehicle using the information processing device is suppressed and a start time and an end time of the time at which control is suppressed.

A seventh aspect is an information processing method that is executable by an information processing device, the method including: by a reception unit, receiving, from a user, setting processing for setting a time at which control of a vehicle using the information processing device is suppressed; and by a transmission unit: in a case in which a first signal is received from the vehicle at a different time from the time at which control of the vehicle is suppressed, and in response to the information processing device vibrating or moving, transmitting a second signal configured to enable control of the vehicle to be permitted, and in a case in which the first signal is received from the vehicle at the time at which control of the vehicle is suppressed, regardless of whether or not the information processing device is vibrating or moving, not transmitting the second signal.

In the information processing method of the seventh aspect, the reception unit receives, from the user, setting processing for setting a time period during which control of the vehicle using the information processing device is suppressed. In a case in which the transmission unit has received the first signal from the vehicle at a time that is different from the time during which control of the vehicle is suppressed, a second signal is transmitted to enable control of the vehicle to be permitted in response to vibration or movement of the information processing device. In a case in which the transmission unit has received the first signal from the vehicle within a time period in which control of the vehicle is suppressed, regardless of whether or not the information processing device is vibrating or moving, the second signal is not transmitted. According to this information processing method, mistaken operation of an information processing device used to perform control of a vehicle can be suppressed.

An eighth aspect is an information processing method that is executable by an information processing device, the method including: by a display, displaying a screen configured to enable a user to perform setting processing for setting a time at which control of a vehicle using the information processing device is suppressed; and by a reception unit, receiving settings according to the setting processing from the user.

In the information processing method of the eighth aspect, the display displays a screen to enable the user to perform setting processing for setting a time period during which control of the vehicle using the information processing device is suppressed. The reception unit then receives settings from the user according to the setting processing. According to this information processing method, mistaken operation of an information processing device used to perform control of a vehicle can be suppressed.

A ninth aspect is a non-transitory recording medium storing a program that is executable by a computer equipped with an information processing device to perform processing, the processing including: acquiring, from a user, setting processing for setting a time at which control of a vehicle using the information processing device is suppressed; in a case in which a first signal is received from the vehicle at a different time from the time at which control of the vehicle is suppressed, and in response to the information processing device vibrating or moving, sending a second signal configured to enable control of the vehicle to be permitted; and in a case in which the first signal is received from the vehicle at the time at which control of the vehicle is suppressed, regardless of whether or not the information processing device is vibrating or moving, not sending the second signal.

According to the program stored on the non-transitory recording medium of the ninth aspect, a computer receives, from a user, setting processing for setting a time period during which control of a vehicle using an information processing device is suppressed. In a case in which the computer has received a first signal from the vehicle at a time that is different from the time during which control of the vehicle is suppressed, a second signal is transmitted to enable control of the vehicle to be permitted in response to vibration or movement of the information processing device. In a case in which the computer has received the first signal from the vehicle within a time period in which control of the vehicle is suppressed, regardless of whether or not the information processing device is vibrating or moving, the second signal is not transmitted. According to this program, mistaken operation of an information processing device used to perform control of a vehicle can be suppressed.

A tenth aspect is a non-transitory recording medium storing a program that is executable by a computer equipped with an information processing device to perform processing, the processing including: displaying a screen configured to enable a user to perform setting processing for setting a time at which control of a vehicle using the information processing device is suppressed; and receiving settings according to the setting processing from the user.

According to the program stored on the non-transitory recording medium of the tenth aspect, a computer displays a screen to enable a user to perform setting processing for setting a time period during which control of a vehicle using an information processing device is suppressed. The computer then receives settings from the user in accordance with the setting processing. According to this program, mistaken operation of an information processing device used to perform control of a vehicle can be suppressed.

Effect of the Invention

The present disclosure enables prevention of mistaken operation of an information processing device used to control a vehicle.

BRIEF DESCRIPTION OF THE DRAWINGS

Exemplary embodiments of the present disclosure will be described in detail based on the following figures, wherein:

FIG. 6 is a flowchart illustrating an example of a flow of digital key vehicle control processing executed by the CPU of a digital key control ECU in an onboard unit of the first and second exemplary embodiments;

FIG. 10 is a flowchart illustrating an example of a flow of digital key verification processing executed by the CPU of a control device in a smartphone of the second exemplary embodiment;

FIG. 11 is a flowchart illustrating an example of a flow of digital key verification processing executed by the CPU of a control device in a smartphone of a modified example of the second exemplary embodiment;

DETAILED DESCRIPTION

Explanation follows regarding a vehicle system according to an exemplary embodiment of the present disclosure, using FIG. 1 to FIG. 13.

First Exemplary Embodiment

Figure 1:
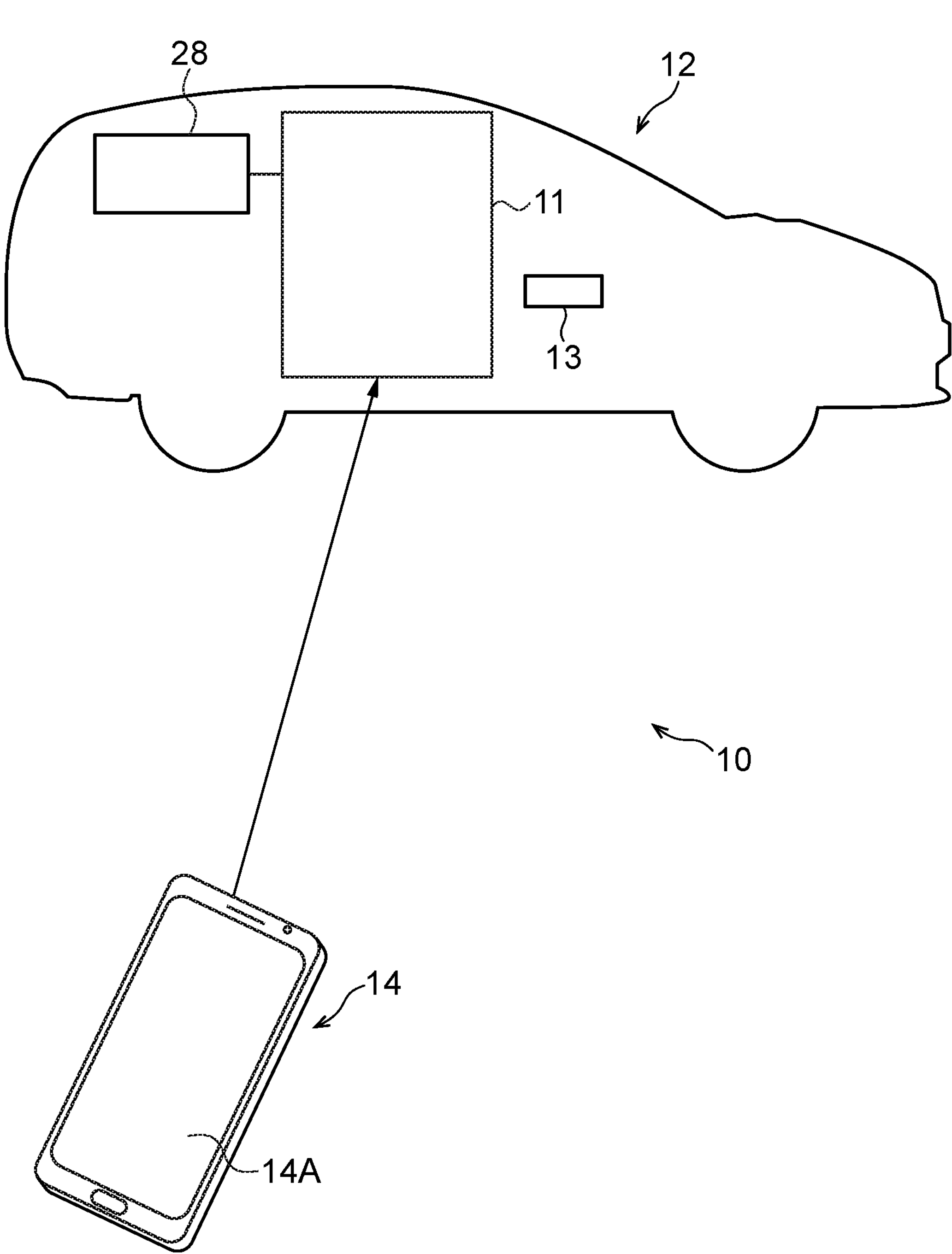
FIG. 1 is a diagram illustrating a schematic configuration of a vehicle system according to first and second exemplary embodiments.

FIG. 1 is a block diagram illustrating a schematic configuration of a vehicle system 10 according to a first exemplary embodiment.

Overall Configuration

As illustrated in FIG. 1, a vehicle system 10 according to the present exemplary embodiment includes a vehicle 12 and a smartphone 14 serving as an information processing device for controlling the vehicle 12.

The vehicle 12 is configured so as to be capable of directly receiving local communication from the smartphone 14 without passing through a network. This communication includes wireless communication and infrared communication.

A door lock device 28 installed in the vehicle 12 performs locking and unlocking of a driver's seat door, a passenger's seat door, a rear door, and a backdoor. An operation whereby a user holding the smartphone 14 contacts the door handle 13 and an operation performed on the smartphone 14 enable the respective doors to be locked and unlocked by the door lock device 28.

Figure 2:
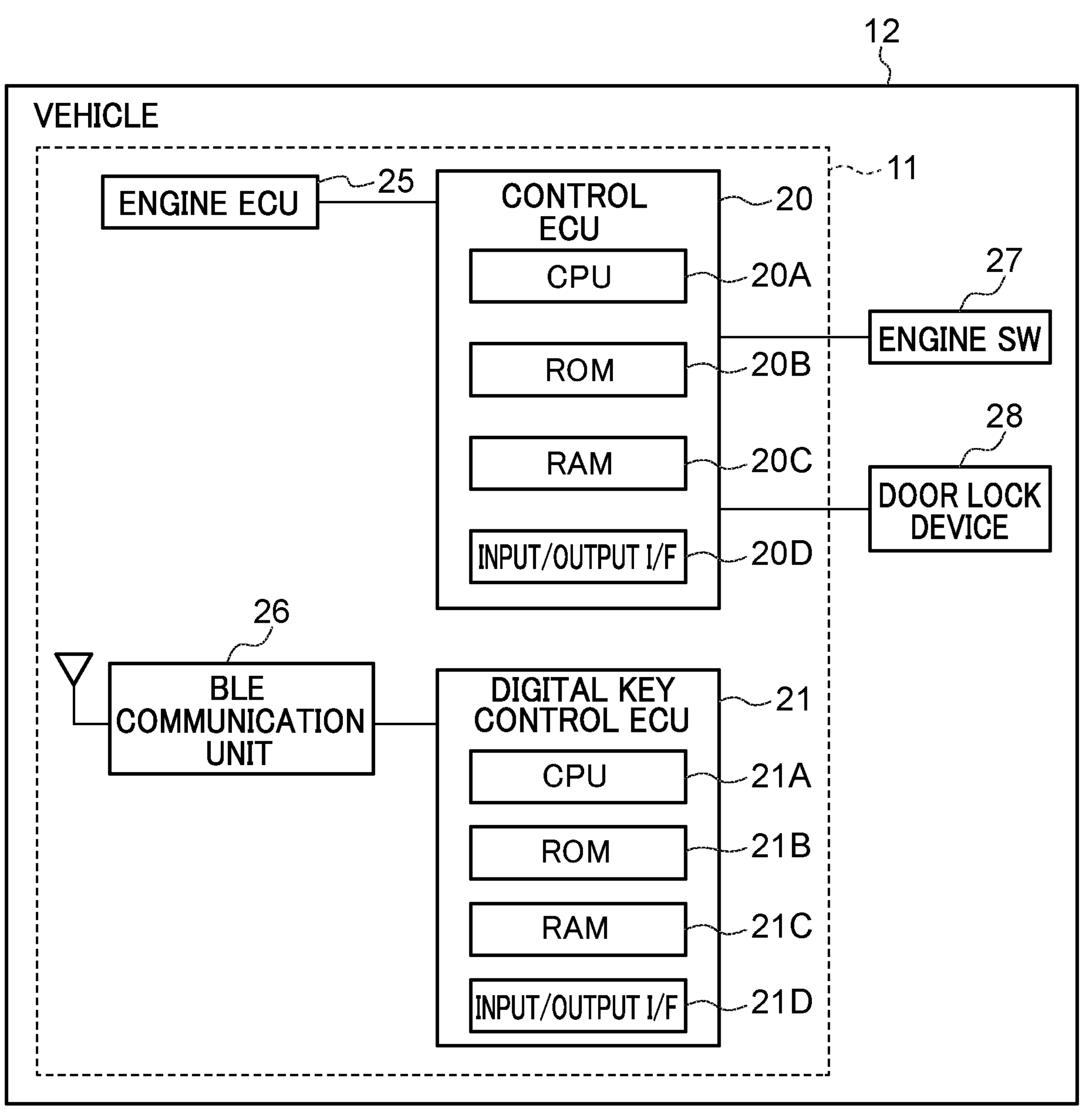
FIG. 2 is a block diagram illustrating a hardware configuration of a vehicle according to the first and second exemplary embodiments.

As illustrated in FIG. 2, an onboard unit 11 installed in the vehicle 12 includes a control electronic control unit (ECU) 20, a digital key control ECU 21, an engine ECU 25, and a Bluetooth (registered trademark) low energy (BLE) communication unit 26.

The engine ECU 25 performs various engine controls including starting and stopping the engine.

The BLE communication unit 26 is a communication unit that performs wireless communication using Bluetooth (registered trademark), and performs communication with a BLE communication section 14C, which is described below.

The vehicle 12 is provided with an engine switch (SW) 27. The engine SW 27 is a switch for instructing starting and stopping of the engine.

The control ECU 20 includes a central processing unit (CPU) 20A, read only memory (ROM) 20B, random access memory (RAM) 20C, and an input/output interface (I/F) 20D. The CPU 20A, the ROM 20B, the RAM 20C, and the input/output I/F 20D are connected so as to be capable of communicating with each other via an internal bus (not shown).

The CPU 20A is a central processing unit that executes various programs and controls various sections. Namely, the CPU 20A reads a program from the ROM 20B, and executes the program using the RAM 20C as a workspace.

The ROM 20B stores various programs and various data.

The RAM 20C serves as a workspace for temporarily storing programs and data.

The input/output I/F 20D is an interface for communicating with each of the engine ECU 25, the engine SW 27, and the door lock device 28.

The control ECU 20 may include storage serving as a storage unit in addition to, or instead of, the ROM 20B. This storage is configured by, for example, a hard disk drive (HDD) or a solid state drive (SSD).

In a case in which the CPU 20A executes a program to successfully check the smartphone 14, the control ECU 20 executes vehicle control including door locking and unlocking by the door lock device 28, turning on the power source of the vehicle 12, and engine starting by the engine ECU 25.

The digital key control ECU 21 includes a CPU 21A, a ROM 21B, a RAM 21C, and an input/output I/F 21D. The CPU 21A, the ROM 21B, the RAM 21C, and the input/output I/F 21D are connected so as to be capable of communicating with each other via an internal bus (not shown).

With regard to the respective functionalities of the CPU 21A, the ROM 21B, the RAM 21C, and the input/output I/F 21D, these are the same as for the above-described CPU 20A, ROM 20B, RAM 20C, and input/output I/F 20D.

The input/output I/F 21D is an interface for communicating with the BLE communication unit 26.

The digital key control ECU 21 may include storage serving as a storage section in addition to or instead of the ROM 21B. This storage is configured by, for example, an HDD or an SSD.

The digital key control ECU 21, based on wireless communication with the smartphone 14 at the BLE communication unit 26, performs authentication processing of the digital key by verifying an ID of the digital key registered in the smartphone 14 against pre-recorded ID information. In cases in which the digital key authentication has been successful, the digital key control ECU 21 transmits a message indicating this fact to the control ECU 20.

Smartphone

Figure 3:
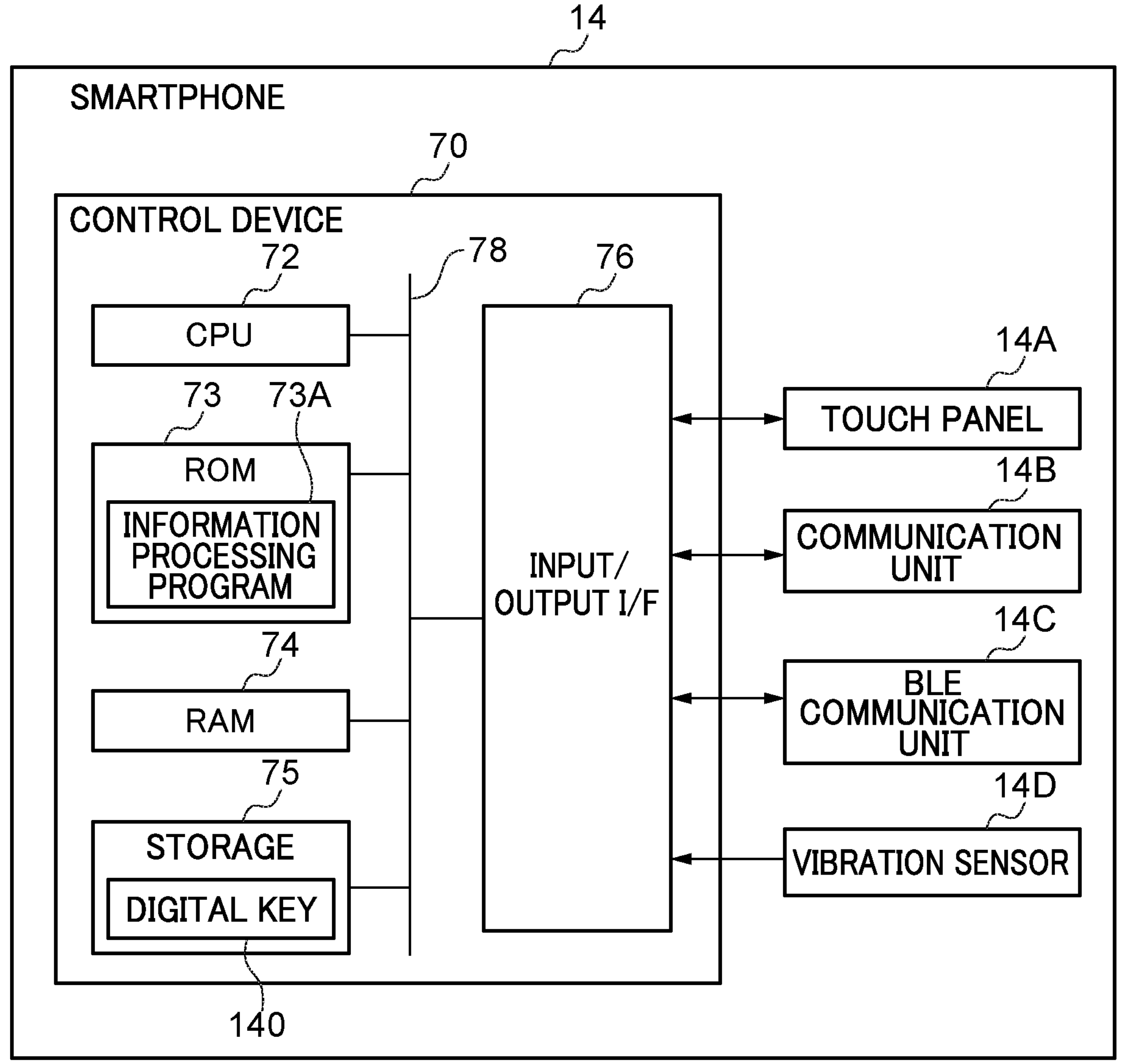
FIG. 3 is a block diagram illustrating a hardware configuration of a smartphone of the first and second exemplary embodiments.

The smartphone 14 is a communication terminal owned by a user. In a case in which verification of a registered digital key by communication with the onboard unit 11 has been successful, the smartphone 14 of the present exemplary embodiment receives user operations for each of locking and unlocking of a door by the door lock device 28, turning on the power source of the vehicle 12, and starting the engine, and is configured to enable locking and unlocking of a door by the door lock device 28, turning on the power source of the vehicle 12, and starting the engine. As illustrated in FIG. 3, the smartphone 14 includes a control device 70, a touch panel 14A, a communication unit 14B, a BLE communication unit 14C, and a vibration sensor 14D.

The control device 70 includes a CPU 72, a ROM 73, a RAM 74, a storage 75, and an input/output I/F 76, the CPU 72 being an example of processor configured by hardware. The CPU 72, the ROM 73, the RAM 74, the storage 75, and the input/output I/F 76 are connected to each other via a bus 78.

The respective functionalities of the CPU 72, the ROM 73, the RAM 74, and the input/output I/F 76 are the same as for the above-described CPU 20A, ROM 20B, RAM 20C, and input/output I/F 20D. A micro SD card may be applied as the storage 75 of the present exemplary embodiment, in addition to storage inside the smartphone 14.

The ROM 73 stores an information processing program 73A, which is an application program for performing vehicle control according to a user operation using a digital key 140.

The CPU 72 reads the information processing program 73A from the ROM 73, and executes the information processing program 73A using the RAM 74 as a workspace. In the present exemplary embodiment, the digital key 140 is registered in the storage 75.

The touch panel 14A, the communication unit 14B, the BLE communication unit 14C, and the vibration sensor 14D are connected to the control device 70 of the present exemplary embodiment via the input/output I/F 76. The touch panel 14A, the communication unit 14B, the BLE communication unit 14C, and the vibration sensor 14D may be directly connected to the bus 78.

When the information processing program 73A is executed, the CPU 72 displays icons for each of locking and unlocking of a door by the door lock device 28, turning on the power source of the vehicle 12, and starting the engine, at the touch panel 14A. When a user operates an icon, the BLE communication unit 14C transmits a signal to the BLE communication unit 26 of the onboard unit 11, the signal instructing vehicle control corresponding to the operated icon (locking or unlocking of the door by the door lock device 28, turning on the power source of the vehicle 12, or starting the engine).

A technique referred to as relay attack is known, in which radio waves from a vehicle are relayed to cause a smart key inside a house to react erroneously. Most of such cases are instigated at night in a home parking space, and conventional smart keys have prevented relay attacks by using a vibration sensor to detect vibration.

Although a smartphone with a registered digital key may have similar functionality, smartphones can be used all the time in a home, and there are concerns that they may not provide the same effect as smart keys. This is because the time spent using a smartphone in a home is long.

Accordingly, in the present exemplary embodiment, a digital key operation prohibition time can be set, and a signal that enables vehicle control to be permitted in response to vibrations of the smartphone outside of the operation prohibition time, is transmitted, and within the operation prohibition time, this signal is not transmitted, regardless of whether or not the smartphone is vibrating. Moreover, the digital key operation prohibition time can be set.

Figure 4:
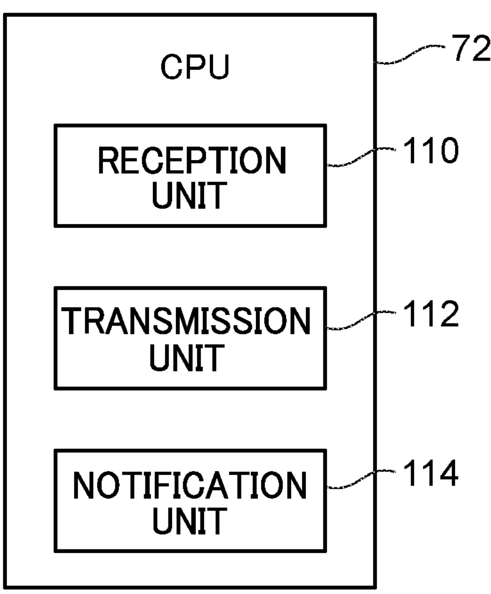
FIG. 4 is a block diagram illustrating an example of a functional configuration of a CPU of a control device in a smartphone of the first and second exemplary embodiments.

Specifically, as illustrated in FIG. 4, the CPU 72 functions as a reception unit 110, a transmission unit 112, and a notification unit 114 by executing the information processing program 73A.

The reception unit 110 receives setting processing, for setting a digital key operation prohibition time, from a user. More specifically, the reception unit 110 displays, at the touch panel 14A, a screen for causing the user to perform setting processing for setting the digital key operation prohibition time.

Figure 5:
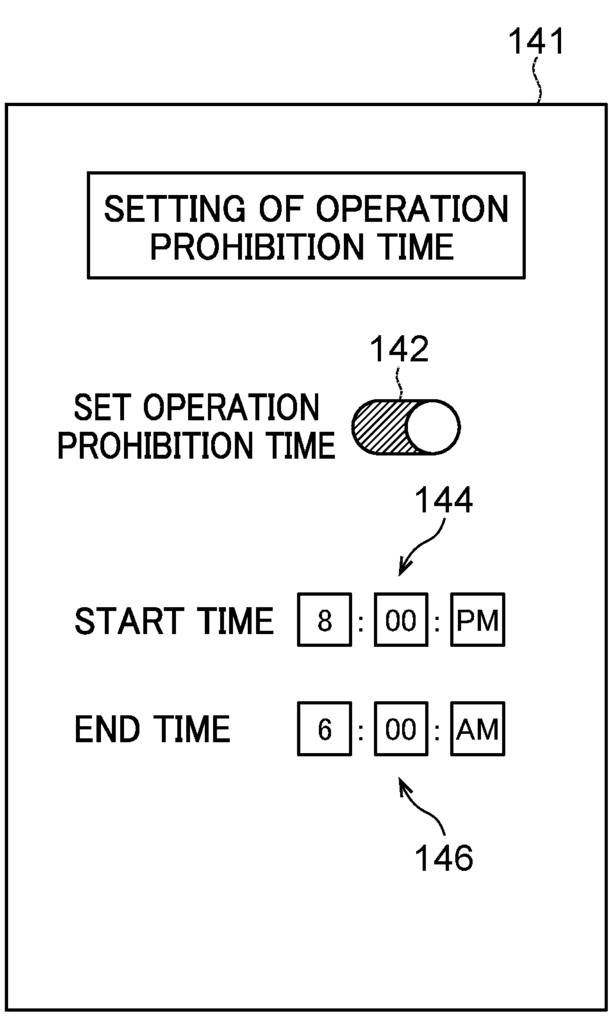
FIG. 5 is a diagram illustrating an example of a screen for setting a digital key operation prohibition time.

For example, the setting screen 141 illustrated in FIG. 5 is displayed at the touch panel 14A, and one of activating or deactivating the setting of the digital key operation prohibition time, and the start time and end time of the digital key operation prohibition time, are received. The setting screen 141 of FIG. 5 includes a button 142 for switching between activating or deactivating the setting of the digital key operation prohibition time, a box 144 for setting the start time of the digital key operation prohibition time, and a box 146 for setting an end time.

In a case in which the transmission unit 112 receives a signal indicating a verification request for the digital key 140 from the vehicle 12 at a time that is different from the digital key operation prohibition time, using the BLE communication unit 14C, in response to vibration of the smartphone 14, the BLE communication unit 14C transmits a signal indicating a verification result and the occurrence of vibration to the vehicle 12 in order to enable control of the vehicle to be permitted. A signal indicating a verification request is an example of a first signal. A signal indicating a verification result and occurrence of vibration is an example of a second signal.

For example, when a user has attempted to unlock a door by an operation of contacting a door handle 13 at a time that is different from the digital key operation prohibition time, in a case in which the BLE communication unit 14C has received a signal from the vehicle 12 indicating a verification request for the digital key 140, if the amount of vibration detected by the vibration sensor 14D within a fixed period in the past is equal to or greater than a threshold value, the BLE communication unitl4C transmits, to the vehicle 12, a signal indicating the verification result and the occurrence of vibration so as to enable control of the vehicle to be permitted. Further, in a case in which the amount of vibration detected by the vibration sensor 14D is less than the threshold value, the BLE communication unit 14C transmits a signal indicating the verification result and a lack of vibration to the vehicle 12. A signal indicating a verification result and a lack of vibration is an example of a third signal.

Moreover, in a case in which the transmission unit 112 has received a signal indicating a verification request for the digital key 140 from the vehicle 12 within the digital key operation prohibition time, using the BLE communication unit 14C, regardless of whether or not the smartphone 14 is vibrating, the smartphone 14 does not transmit a signal indicating a verification result and a lack of vibration.

For example, when a user attempts to unlock a door by an operation of contacting the door handle 13 during the digital key operation prohibition time, in a case in which the BLE communication unit 14C has received a signal from the vehicle 12 indicating a verification request for the digital key 140, the BLE communication unit 14C does not transmit a signal indicating the verification result and a lack of vibration to the vehicle 12.

In a case in which the notification unit 114 has received a signal indicating a verification request for the digital key 140 from the vehicle during the digital key operation prohibition time, a message indicating that digital key operation is currently prohibited is delivered using the touch panel 14A.

For example, when a user attempts to unlock a door by an operation of contacting the door handle 13 during the digital key operation prohibition time, a message indicating that the digital key operation prohibition time is currently in effect is displayed at the touch panel 14A. Further, the user invalidates the setting of the digital key operation prohibition time at the settings screen 141 of FIG. 5 described above, and unlocks the door by, once more, an operation in which the user contacts the door handle 13.

Processing Flow

Figure 7:
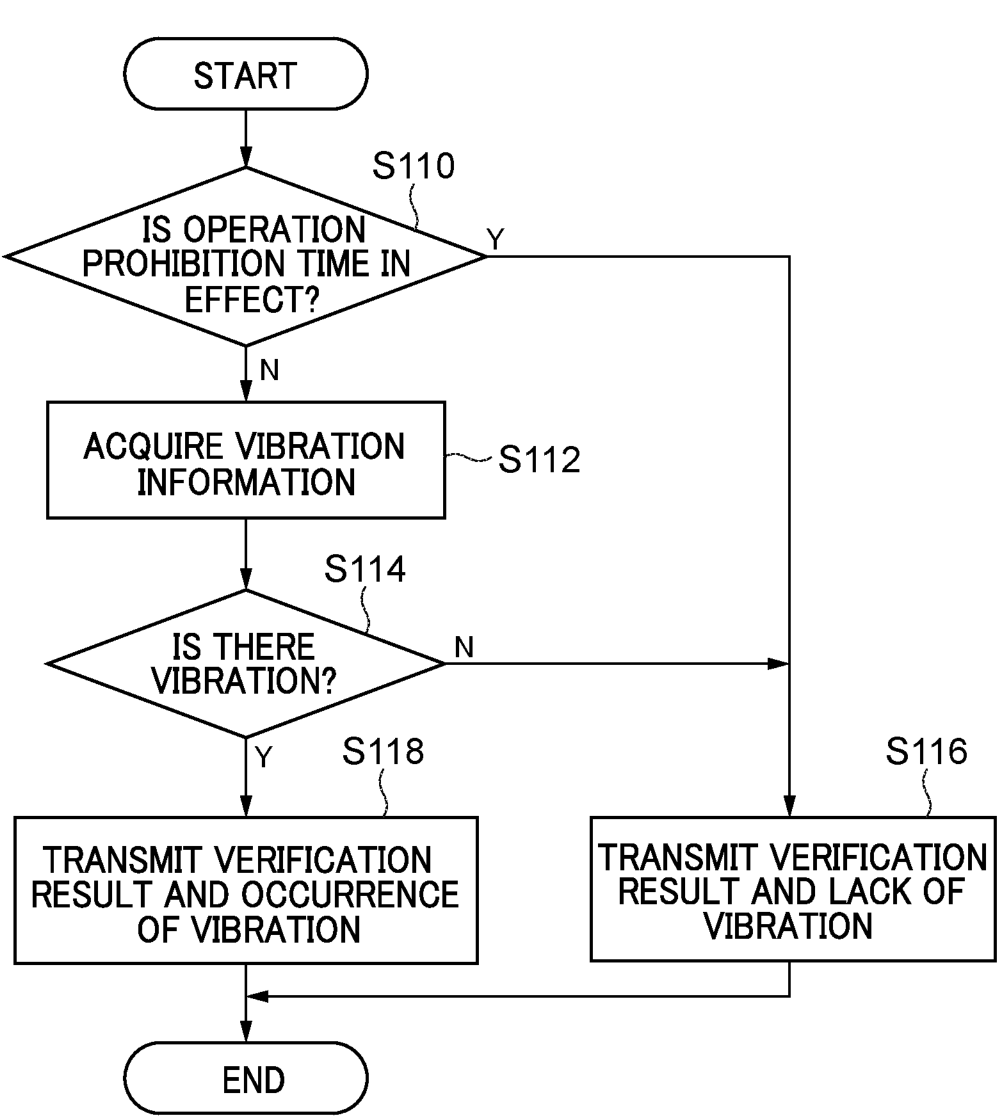
FIG. 7 is a flowchart illustrating an example of a flow of digital key verification processing executed by the CPU of a control device in a smartphone of the first exemplary embodiment.

Next, explanation follows regarding the flow of processing performed by the vehicle system 10 of the present exemplary embodiment, with reference to the flowcharts of FIG. 6 to FIG. 7.

First, when an operation by the user with respect to the vehicle 12 is received in a state in which the BLE communication unit 26 of the vehicle 12 and the BLE communication unit 14C of the smartphone 14 are capable of communicating with each other, the CPU 21A of the digital key control ECU 21 of the onboard unit 11 executes the program whereby the digital key vehicle control processing illustrated in FIG. 6 is performed. Explanation follows regarding an example in which a user attempts to unlock a door by an operation of contacting the door handle 13.

First, at step S100, the CPU 21A uses the BLE communication unit 26 to transmit a signal indicating a verification request for the digital key 140 to the BLE communication unit 14C of the smartphone 14. The signal indicating the verification request for the digital key 140 includes ID information indicating an ID of the digital key 140 recorded in advance at the vehicle 12 side.

Further, when the BLE communication unit 14C of the smartphone 14 receives a signal indicating a verification request for the digital key 140, the CPU 72 of the control device 70 of the smartphone 14 executes the information processing program 73A, whereby the digital key verification processing illustrated in FIG. 7 is performed. The reception unit 110 receives, in advance, setting processing for setting the digital key operation prohibition time from the user. Explanation follows regarding an example in which a setting of the digital key operation prohibition time has been activated.

At step S110, the CPU 72, serving as the transmission unit 112, determines whether or not the digital key operation prohibition time is in effect. In a case in which the current time is within the digital key operation prohibition time, the CPU 72 transitions to step S116. Further, in a case in which the current time is outside the digital key operation prohibition time, the CPU 72 transitions to step S112.

At step S112, the CPU 72, serving as the transmission unit 112, acquires time series data for vibration information detected within a fixed time period in the past by the vibration sensor 14D.

At step S114, the CPU 72, serving as the transmission unit 112, determines whether or not vibration of the smartphone 14 has occurred, based on the time series data for the vibration information acquired at step S112 described above. For example, in a case in which the acquired time series data for the vibration information includes vibration information representing vibration of a certain magnitude or greater, the CPU 72 determines that vibration of the smartphone 14 has occurred, and transitions to step S118. Further, in a case in which the acquired time series data for the vibration information does not include vibration information representing vibration of a certain magnitude or greater, the CPU 72 determines that vibration of the smartphone 14 has not occurred, and transitions to step S116.

At step S116, the CPU 72, serving as the transmission unit 112, transmits a signal indicating a verification result and no vibration to the vehicle 12 using the BLE communication unit 14C, and ends the digital key verification processing. In a case in which the ID information included in the signal received from the vehicle 12 and indicating the verification request for the digital key 140 matches the ID of the digital key 140 registered in the smartphone 14, a signal indicating a verification result indicating successful verification is transmitted to the vehicle 12. Further, in a case in which the ID information included in the signal received from the vehicle 12 and indicating the verification request for the digital key 140 does not match the ID of the digital key 140 registered in the smartphone 14, a signal indicating a verification result indicating that verification has failed is transmitted to the vehicle 12.

At step S118, the CPU 72, serving as the transmission unit 112, uses the BLE communication unit 14C to transmit a signal indicating the same verification results as described above and occurrence of vibration to the vehicle 12, and ends the digital key verification processing.

Further, at step S102 in the digital key vehicle control processing of FIG. 6 described above, based on the verification result received from the smartphone 14 by the BLE communication unit 26, the CPU 21A determines whether or not the verification was successful. In a case in which the verification result received from the smartphone 14 by the BLE communication unit 26 indicates that the verification was successful, the processing transitions to step S104. Further, in a case in which the verification result received from the smartphone 14 by the BLE communication unit 26 indicates that the verification was unsuccessful, the digital key vehicle control processing is ended.

At step S104, the CPU 21A determines whether or not a signal indicating the occurrence of vibration has been received from the smartphone 14 by the BLE communication unit 26. In a case in which the BLE communication unit 26 has received a signal indicating the occurrence of vibration from the smartphone 14, the processing transitions to step S106. Further, in a case in which the BLE communication unit 26 receives a signal indicating a lack of vibration from the smartphone 14, the digital key vehicle control processing is ended.

At step S106, the CPU 21A requests that the control ECU 20 unlocks the door, and ends the digital key vehicle control processing. Further, the control ECU 20 effects control such that the respective doors are locked by the door lock device 28.

Figure 8:
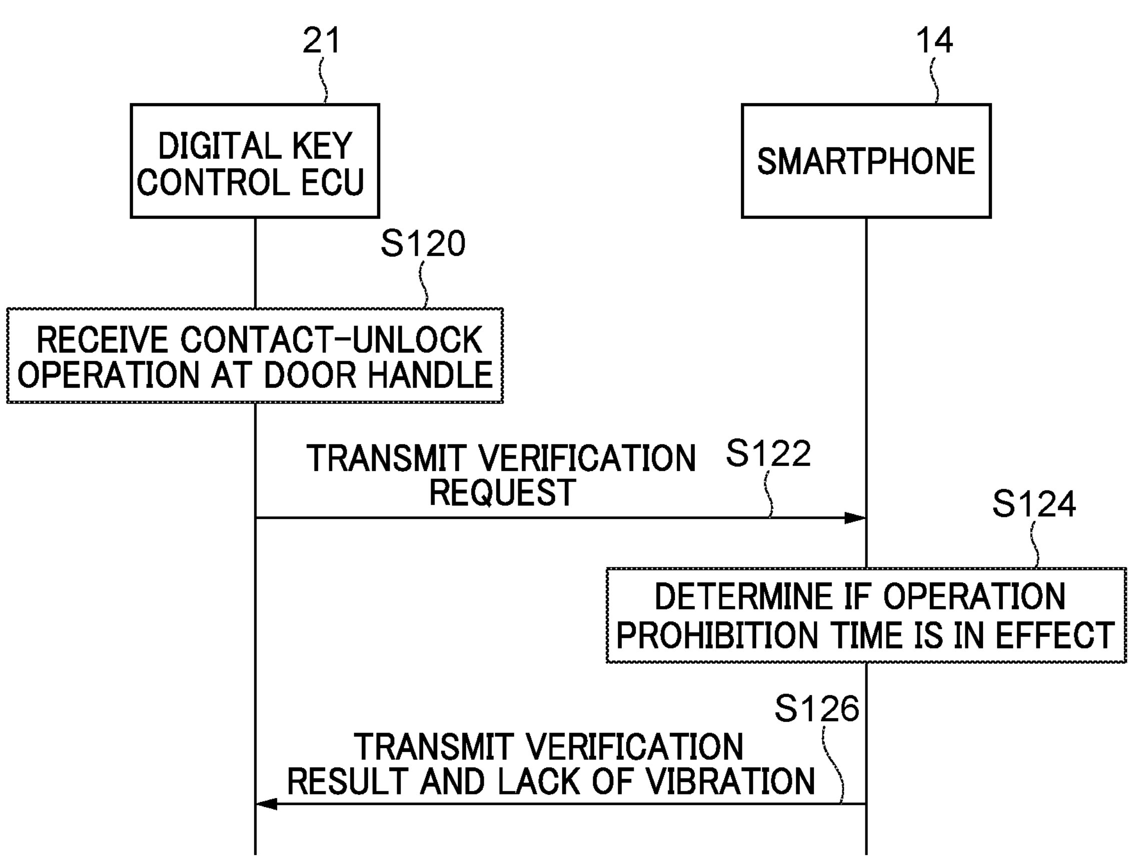
FIG. 8 is a sequence diagram illustrating an example of a flow of processing in the vehicle system of the first exemplary embodiment.
Figure 9:
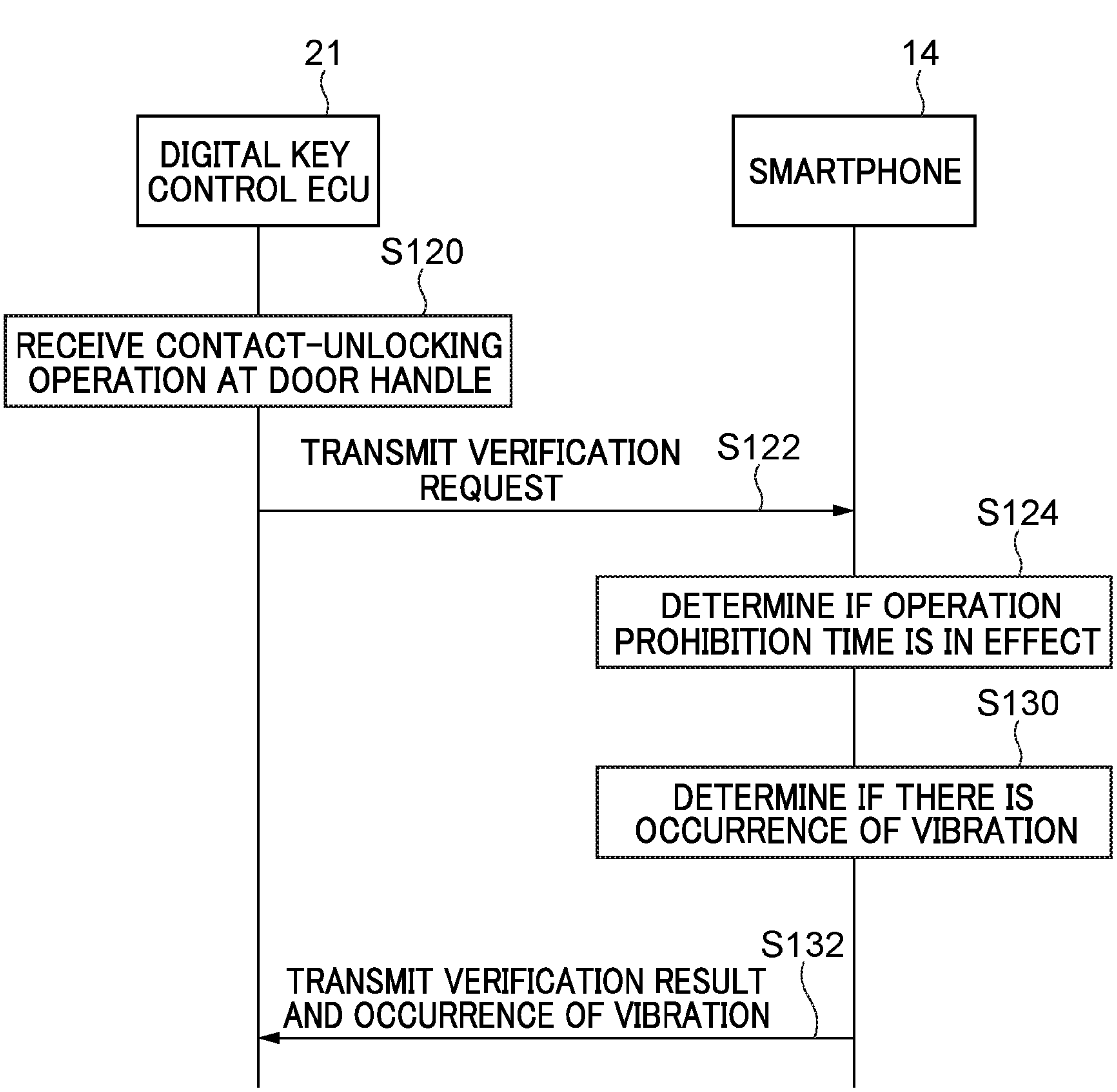
FIG. 9 is a sequence diagram illustrating an example of a flow of processing in the vehicle system of a first exemplary embodiment.

Next, explanation follows regarding an example of a flow of processing in a case in which the digital key vehicle control processing and the digital key verification processing described above are executed, with reference to the sequence diagrams of FIG. 8 and FIG. 9. Explanation follows regarding an example of a case, in FIG. 8, of an operation to unlock a door of the vehicle 12, in which a user outside the vehicle

12 performs an operation of contacting the door handle 13, and the current time is within the digital key operation prohibition time, and there is no vibration of the smartphone 14.

First, at step S120, the digital key control ECU 21 receives an operation in which a user outside the vehicle 12 contacts the door handle 13 as an operation to unlock a door of the vehicle 12.

At step S122, the digital key control ECU 21 uses the BLE communication unit 26 to transmit a signal indicating a verification request for the digital key 140 to the BLE communication unit 14C of the smartphone 14.

Further, at step S124, the smartphone 14 determines that the current time is within the digital key operation prohibition time.

Then, at step S126, the smartphone 14 uses the BLE communication unit 14C to transmit a signal indicating the verification result of the digital key 140 and a lack of vibration to the vehicle 12. Further, the digital key control ECU 21 determines that there is no vibration of the smartphone 14, and does not unlock the door of the vehicle 12.

Moreover, explanation follows regarding an example of a case in which a user outside the vehicle 12 performs an operation of contacting the door handle 13 as an operation to unlock the door of the vehicle 12, and the current time is outside the digital key operation prohibition time. The same reference numerals are allocated to the same processes as those in FIG. 8 above, and detailed explanation thereof is omitted.

First, at step S120, the digital key control ECU 21 receives an operation in which a user outside the vehicle 12 contacts the door handle 13 as an operation to unlock a door of the vehicle 12.

At step S122, the digital key control ECU 21 uses the BLE communication unit 26 to transmit a signal indicating a verification request for the digital key 140 to the BLE communication unit 14C of the smartphone 14.

Then, at step S124, the smartphone 14 determines that the current time is outside the digital key operation prohibition time.

Then, at step S130, based on the time series data of the vibration information acquired from the vibration sensor 14D, the smartphone 14 determines whether or not there has been vibration of the smartphone 14.

Then, at step S132, the smartphone 14 uses the BLE communication section 14C to transmit a signal indicating the verification result for the digital key 140 and the vibration information to the vehicle 12. Moreover, in a case in which the vibration information indicates that there has been no vibration of the smartphone 14, the digital key control ECU 21 does not unlock the door of the vehicle 12. Further, in a case in which the digital key control ECU 21 determines that the vibration information indicates vibration of the smartphone 14, the digital key control ECU 21 unlocks the door of the vehicle 12.

Summary of the First Exemplary Embodiment

The smartphone 14 of the present exemplary embodiment enables setting of the digital key operation prohibition time, and in a case in which the smartphone 14 receives a digital key verification request from the vehicle 12 within the digital key operation prohibition time, regardless of whether or not the smartphone 14 is vibrating, does not transmit a signal to enable control of the vehicle to be permitted. This enables mistaken operation (e.g., a relay attack) of the smartphone used to control the vehicle to be suppressed.

Moreover, from the point of view of security and in order to suppress mistaken operation of a smartphone having a digital key recorded thereon, control of a vehicle using the smartphone can be denied permission during a given time period set by the user.

Further, in a case in which a digital key operation prohibition time is set on the smartphone, at the time of a verification request from the digital key control ECU 21, if it is within the digital key operation prohibition time, a signal indicating a lack of vibration is always returned, thereby enabling prevention of the vehicle being unlocked using the digital key.

Second Exemplary Embodiment

In the first exemplary embodiment, in a case in which the digital key operation prohibition time is in effect, regardless of whether or not the smartphone 14 is vibrating, a signal indicating the verification result and a lack of vibration are transmitted to the vehicle by the smartphone. In contrast, the second exemplary embodiment differs from the first exemplary embodiment in that a signal is not transmitted to the vehicle 12 in a case in which the digital key operation prohibition time is in effect or in a case in which the smartphone 14 is not vibrating. Explanation follows regarding differences from the first exemplary embodiment. Here, the same reference numerals are allocated to the same components, and explanation thereof is omitted.

Smartphone

As illustrated in FIG. 4 described above, the CPU 72 of the control device 70 of the smartphone 14 implements the information processing program 73A, thereby functioning as the reception unit 110, the transmission unit 112, and the notification unit 114.

In a case in which the BLE communication unit 14C has received a signal indicating a verification request for the digital key 140 from the vehicle 12, in response to the fact that the smartphone 14 is not vibrating, the transmission unit 112 does not transmit a signal to the vehicle 12 using the BLE communication unit 14C. As a result, a signal indicating the verification result and the vibration information is not transmitted to the vehicle 12.

Moreover, in a case in which the transmission unit 112 has received a signal indicating a verification request for the digital key 140 from the vehicle 12 within the digital key operation prohibition time, using the BLE communication unit 14C, regardless of whether or not the smartphone 14 is vibrating, the BLE communication unit 14C does not transmit a signal to the vehicle 12. As a result, a signal indicating the verification result and the vibration information is not transmitted to the vehicle 12.

In a case in which the transmission unit 112 receives a signal indicating a verification request for the digital key 140 from the vehicle 12 at a time that is different from the digital key operation prohibition time, using the BLE communication unit 14C, in response to vibration of the smartphone 14, the BLE communication unit 14C transmits a signal indicating a verification result and the occurrence of vibration to the vehicle 12 in order to enable control of the vehicle to be permitted.

Processing Flow

Next, explanation follows regarding the flow of processing performed by the vehicle system 10 of the present exemplary embodiment, with reference to the flowcharts of FIG. 6 and FIG. 10. Here, the same reference numerals are allocated to the same processes as those of the first exemplary embodiment, and detailed explanation thereof is omitted.

First, when an operation by the user with respect to the vehicle 12 is received in a state in which the BLE communication unit 26 of the vehicle 12 and the BLE communication unit 14C of the smartphone 14 are capable of communicating with each other, the CPU 21A of the digital key control ECU 21 of the onboard unit 11 implements the program and performs the digital key vehicle control processing illustrated in FIG. 6 described above.

Further, when the BLE communication unit 14C of the smartphone 14 receives a signal indicating a verification request for the digital key 140, the CPU 72 of the control device 70 of the smartphone 14 implements the information processing program 73A and performs the digital key verification processing illustrated in FIG. 10. The reception unit 110 accepts, in advance, setting processing for setting the digital key operation prohibition time from the user. Explanation follows regarding an example in which a setting of the digital key operation prohibition time has been activated.

First, at step S112, the CPU 72, serving as the transmission unit 112, acquires time series data for vibration information detected by the vibration sensor 14D within a fixed period of time in the past.

At step S114, the CPU 72, serving as the transmission unit 112, and determines whether or not vibration of the smartphone 14 has occurred, based on the time series data for the vibration information acquired at step S112 described above. For example, in a case in which the time series data of the acquired vibration information includes vibration information representing vibration of a certain magnitude or greater, the CPU 72 determines that vibration of the smartphone 14 has occurred, and transitions to step S110. Further, in a case in which the time series data of the acquired vibration information does not include vibration information representing vibration of a certain magnitude or greater, it is determined that the smartphone 14 has not vibrated, and the CPU 72 ends the digital key verification processing without transmitting any signal to the vehicle 12.

At step S110, the CPU 72, serving as the transmission unit 112, determines whether or not the digital key operation prohibition time is in effect. In a case in which the current time is within the digital key operation prohibition time, the CPU 72 ends the digital key verification processing without transmitting any signal to the vehicle 12. Further, in a case in which the current time is outside the digital key operation prohibition time, the CPU 72 transitions to step S118.

At step S118, the CPU 72, serving as the transmission unit 112, transmits a signal indicating the verification result and the occurrence of vibration to the vehicle 12 using the BLE communication unit 14C, and ends the digital key verification processing.

Summary of Second Exemplary Embodiment

The smartphone 14 of the present exemplary embodiment enables setting of a digital key operation prohibition time, and in a case in which a digital key verification request is received from the vehicle 12 within the digital key operation prohibition time, regardless of whether or not the smartphone 14 is vibrating, the smartphone 14 does not transmit a signal to enable control of the vehicle to be permitted. This enables mistaken operation of the smartphone used to control the vehicle to be suppressed.

MODIFIED EXAMPLES

Although, in the present exemplary embodiments, explanation has been given regarding examples in which, in the digital key verification processing, it is determined whether or not the digital key operation prohibition time is in effect after determining whether or not vibration has occurred at the smartphone 14, there is no limitation thereto. In the digital key verification processing, it may be determined whether or not vibration has occurred at the smartphone 14 after determining whether or not the digital key operation prohibition time is in effect.

For example, the CPU 72 of the control device 70 of the smartphone 14 implements the information processing program 73A and thereby performs the digital key verification processing illustrated in FIG. 11. Here, the same reference numerals are allocated to the same processes as those in the above-described exemplary embodiments, and detailed explanation thereof is omitted.

First, at step S110, the CPU 72, serving as the transmission unit 112, determines whether or not the digital key operation prohibition time is in effect. In a case in which the current time is within the digital key operation prohibition time, the CPU 72 ends the digital key verification processing without transmitting any signal to the vehicle 12. Further, in a case in which the current time is outside the digital key operation prohibition time, the CPU 72 transitions to step S112.

At step S112, the CPU 72, serving as the transmission unit 112, acquires time series data for vibration information detected within a fixed time period in the past by the vibration sensor 14D.

At step S114, the CPU 72, serving as the transmission unit 112, determines whether or not vibration of the smartphone 14 has occurred, based on the time series data for the vibration information acquired at step S112 described above. For example, in a case in which the acquired time series data for the vibration information includes vibration information representing vibration of a certain magnitude or greater, the CPU 72 determines that vibration of the smartphone 14 has occurred, and transitions to step S118. Further, in a case in which the time series data of the acquired vibration information does not include vibration information representing vibration of a certain magnitude or greater, it is determined that there has been no vibration of the smartphone 14, and the CPU 72 ends the digital key verification processing without transmitting any signal to the vehicle 12.

At step S118, the CPU 72, serving as the transmission unit 112, transmits a signal indicating the verification result and the occurrence of vibration to the vehicle 12 using the BLE communication unit 14C, and ends the digital key verification processing.

Although explanation has been given regarding an example in which, in the digital key verification processing, a signal is not transmitted to the vehicle 12 in a case in which the digital key operation prohibition time is in effect or in a case in which there has been no vibration of the smartphone 14, there is no limitation thereto. It would be acceptable, in the digital key verification processing, in either of a case in which the digital key operation prohibition time is in effect or a case in which there has been no vibration of the smartphone 14, for a signal not to be sent to the vehicle 12, and in other cases, for a signal indicating a verification result and a lack of vibration to be transmitted.

Figure 12:
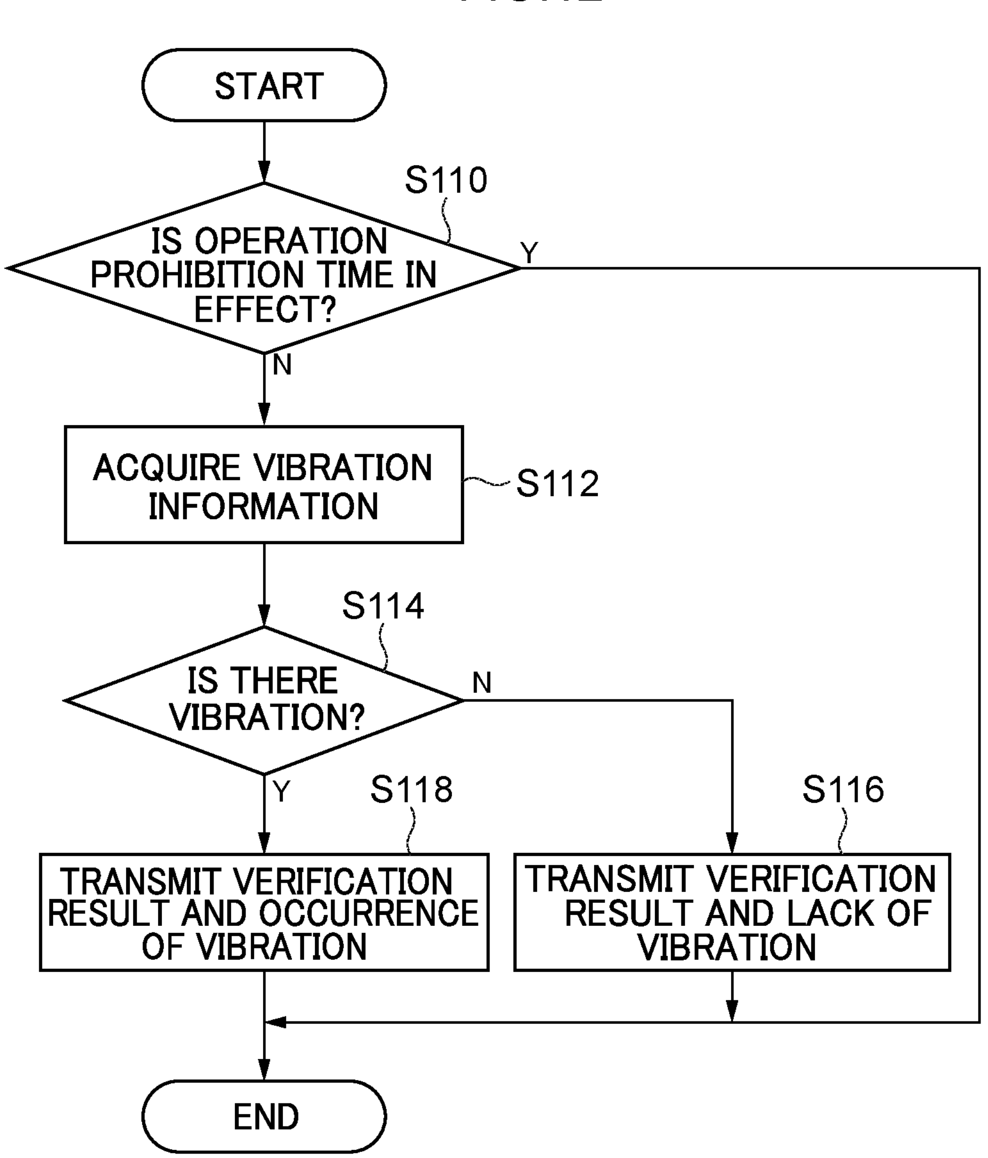
FIG. 12 is a flowchart illustrating an example of a flow of digital key verification processing executed by the CPU of a control device in a smartphone of a modified example of the second exemplary embodiment.

For example, the CPU 72 of the control device 70 of the smartphone 14 implements the information processing program 73A and thereby performs the digital key verification processing illustrated in FIG. 12.

First, at step S110, the CPU 72, serving as the transmission unit 112, determines whether or not the digital key operation prohibition time is in effect. In a case in which the current time is within the digital key operation prohibition time, the CPU 72 ends the digital key verification processing without transmitting any signal to the vehicle 12. Further, in a case in which the current time is outside the digital key operation prohibition time, the CPU 72 transitions to step S112.

At step S112, the CPU 72, serving as the transmission unit 112, acquires time series data for vibration information detected within a fixed time period in the past by the vibration sensor 14D.

At step S114, the CPU 72, serving as the transmission unit 112, determines whether or not vibration of the smartphone 14 has occurred, based on the time series data for the vibration information acquired at step S112 described above. For example, in a case in which the acquired time series data for the vibration information includes vibration information representing vibration of a certain magnitude or greater, the CPU 72 determines that vibration of the smartphone 14 has occurred, and transitions to step S118. Further, in a case in which the acquired time series data for the vibration information does not include vibration information representing vibration of a certain magnitude or greater, the CPU 72 determines that vibration of the smartphone 14 has not occurred, and transitions to step S116.

At step S116, the CPU 72, serving as the transmission unit 112, transmits a signal indicating a verification result and a lack of vibration to the vehicle 12 using the BLE communication unit 14C, and ends the digital key verification processing.

At step S118, the CPU 72, serving as the transmission unit 112, transmits a signal indicating the verification result and the occurrence of vibration to the vehicle 12 using the BLE communication unit 14C, and ends the digital key verification processing.

Although explanation has been given regarding an example of a case in which, in FIG. 12 described above, in the digital key verification processing, in a case in which the digital key operation prohibition time is in effect, a signal is not sent to the vehicle 12, and in a case in which there is no vibration of the smartphone 14, a signal indicating a verification result and a lack of vibration is transmitted, the reverse of this may be applied. Namely, in a case in which the digital key operation prohibition time is in effect, a signal indicating the verification result and a lack of vibration may be transmitted, and in a case in which the smartphone 14 has not vibrated, it may be that no signal is transmitted to the vehicle 12.

Notes

Although explanation has been given regarding examples of cases in which a digital key operation prohibition time is set in the above exemplary embodiments, there is no limitation thereto. For example, a digital key operation permission time may be set. In such a case, in a case in which the transmission unit 112 has received a signal indicating a verification request for the digital key 140 from the vehicle 12 within the digital key operation permission time, in response to vibration of the smartphone 14, the BLE communication unit 14C transmits a signal indicating a verification result and the occurrence of vibration to the vehicle 12 in order to enable control of the vehicle to be permitted.

Moreover, in a case in which the transmission unit 112 has received a signal indicating a verification request for the digital key 140 from the vehicle 12 outside the digital key operation permission time using the BLE communication unit 14C, regardless of whether or not the smartphone 14 is vibrating, a verification result and a signal indicating the occurrence of vibration are not transmitted.

Moreover, the reception unit 110 receives setting processing for setting a digital key operation permission time from a user. More specifically, the reception unit 110 displays a screen at the touch panel 14A to enable the user to perform setting processing to set the digital key operation permission time.

Figure 13:
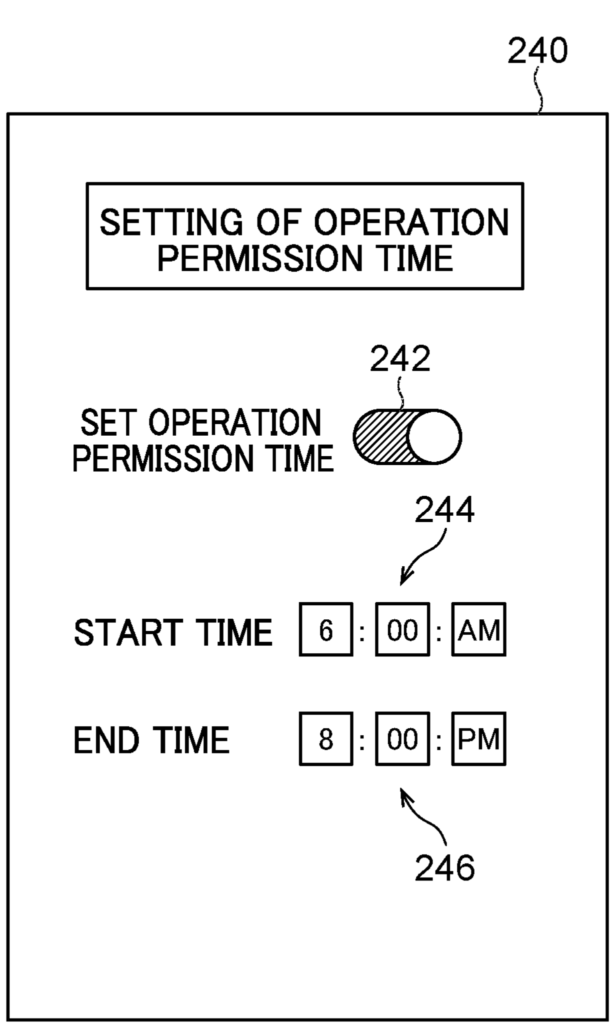
FIG. 13 is a diagram illustrating an example of a screen for setting a digital key operation permission time.

For example, the setting screen 240 illustrated in FIG. 13 is displayed at the touch panel 14A, and one of activating or deactivating the setting of the digital key operation permission time, and the start time and end time of the digital key operation permission time, are received. The setting screen 240 of FIG. 13 includes a button 242 for switching to one of activating or deactivating the setting of the digital key operation permission time, a box 244 for setting the start time of the digital key operation permission time, and a box 246 for setting the end time.

Although, in the present exemplary embodiment, a case in which the smartphone 14 transmits, to the vehicle 12, a signal indicating a verification result and the occurrence of vibration for enabling control of the vehicle to be permitted, in response to the fact that the smartphone 14 is vibrating outside the digital key operation prohibition time, has been explained as an example, there is no limitation thereto. For example, in response to movement of the smartphone 14 outside the digital key operation prohibition time, the smartphone 14 may transmit a signal indicating a verification result and the occurrence of the movement to the vehicle 12 in order to enable control of the vehicle to be permitted. For example, in a case in which the amount of change in the intensity of radio waves transmitted from the vehicle 12 to the smartphone 14 is equal to or greater than a threshold value, it is presumed that the smartphone 14 is moving. Further, in a case in which the amount of change in the intensity of radio waves transmitted from the vehicle 12 to the smartphone 14 is less than the threshold value, it is presumed that the smartphone 14 is not moving. Moreover, regardless of whether or not the smartphone 14 is moving within the digital key operation prohibition time, a signal indicating a verification result and the occurrence of movement, for enabling control of the vehicle to be permitted, is not transmitted to the vehicle 12.

Although a case in which a signal indicating a verification request for the digital key 140 is transmitted from the vehicle 12 to the smartphone 14 when a user attempts to unlock the door by an operation of contacting the door handle 13 has been explained as an example, there is no limitation thereto. For example, when a user attempts to start an engine by operating the engine SW 27, the vehicle 12 may transmit a signal indicating a verification request for the digital key 140 to the smartphone 14.

Although the information processing device at which the digital key is registered is the smartphone 14 in the above exemplary embodiments, there is no limitation thereto, and the digital key 140 may be registered in a device having communication functionality, such as a tablet computer, a wearable computer, or the like.

Although a case in which the smartphone 14 performs wireless communication with the onboard unit 11 using Bluetooth (registered trademark) in the respective exemplary embodiments has been explained as an example, there is no limitation thereto. For example, the smartphone 14 may perform wireless communication with the onboard unit 11 using NFC or UWB.

Although a case in which the vehicle 12 is a vehicle that operates and drives an engine using gasoline as motive power has been explained as an example, there is no limitation thereto. The vehicle 12 may be an electric vehicle such as a hybrid electric vehicle (HEV), a plug-in hybrid electric vehicle (PHEV), a fuel cell electric vehicle (FCEV), or a battery electric vehicle (BEV).

The various processes executed by the CPU 72 reading and executing software (programs) in the above-described exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The various processes may be executed by any one of these various types of processor, or by a combination of two or more of the same type or different types of processor (such as plural FPGAs, or a combination of a CPU and an FPGA). The hardware structure of these various types of processors is, more specifically, an electric circuit combining circuit elements such as semiconductor elements.

In the above-described exemplary embodiments, the respective programs are stored (installed) in advance in a non-transitory recording medium that is readable by a computer. For example, the information processing program 73A in the smartphone 14 is stored in advance in the ROM 73. However, the respective programs are not limited thereto, and may be provided in a format recorded on a non-transitory recording medium such as compact disc read only memory (CD-ROM), digital versatile disc read only memory (DVD-ROM), or universal serial bus (USB) memory. Alternatively, the respective programs may be provided in a format downloadable from an external device over a network.

The flow of processing described in the above-described exemplary embodiments is also an example, and unnecessary steps may be deleted, new steps may be added, or the processing order may be rearranged within a range not departing from the spirit of the present invention.

In addition, the respective configurations of onboard devices, smartphones, physical keys, and management servers described in the above exemplary embodiments are examples, and may be modified according to circumstance within a range not departing from the spirit of the present invention.

What is claimed is:

1. An information processing device, comprising:

a memory;

a vibration sensor that detects a mechanical vibration of the information processing device and outputs time-series data of the vibration of the information processing device; and a processor coupled to the memory and the vibration sensor, the processor being configured to:

receive, from a user, setting processing for setting a time at which control of a vehicle using the information processing device is suppressed, receive, from the vehicle, a first signal requesting verification of a digital key stored in the memory;

in response to determining that the first signal is received from the vehicle at a different time from the time at which control of the vehicle is suppressed:

determine whether an amount of the time-series data of the vibration output by the vibration sensor within a fixed period is equal to or greater than a threshold, in response to determining that the amount of the time-series data of the vibration output by the vibration sensor within the fixed period is equal to or greater than the threshold, transmit, to the vehicle, a second signal including (i) data indicating a success or failure result of the verification of the digital key and (ii) data indicating an occurrence of the vibration, wherein the second signal permits control of the vehicle by the information processing device to perform a function that includes at least one of locking and unlocking of an opening/closing section, turning on a power source, or starting an engine of the vehicle, and in response to determining that the amount of the time-series data of the vibration output by the vibration sensor within the fixed period is less than the threshold, transmit, to the vehicle, a third signal including (i) the data indicating the success or failure result of the verification of the digital key and (ii) data indicating a lack of vibration, wherein the third signal suppresses control of the vehicle by the information processing device, and in response to determining that the first signal is received from the vehicle at the time at which control of the vehicle is suppressed, transmit the third signal including (i) the data indicating the success or failure result of the verification of the digital key and (ii) the data indicating the lack of vibration, to the vehicle without determining whether the amount of the time-series data of the vibration output by the vibration sensor within the fixed period is equal to or greater than the threshold or is less than the threshold.

2. The information processing device of claim 1, wherein the processor is configured to:

in response to determining that the amount of the time-series data of the vibration output by the vibration sensor within the fixed period is less than the threshold, transmit the third signal such that an accidental control of the vehicle is prevented even after the first signal is received at the different time from the time at which control of the vehicle is suppressed.

3. The information processing device of claim 1, wherein the processor is further configured to:

in response to determining that the first signal is received from the vehicle at the time at which control of the vehicle is suppressed, report that it is the time at which control of the vehicle is suppressed.

4. The information processing device of claim 1, wherein the second signal is transmitted from the information processing device to the vehicle directly without passing through a network.

5. The information processing device of claim 1, wherein, after the second signal is transmitted, at least one electronic control unit (ECU) on board the vehicle is controlled by the information processing device.

6. The information processing device of claim 1, wherein the information processing device is a smartphone on which the digital key corresponding to the vehicle is registered.

7. An information processing device, comprising:

a memory;

a vibration sensor that detects a mechanical vibration of the information processing device and outputs time-series data of the vibration of the information processing device; and a processor coupled to the memory and the vibration sensor, the processor being configured to:

display a screen configured to enable a user to perform setting processing for setting a time at which control of a vehicle using the information processing device is suppressed, receive settings according to the setting processing from the user, receive, from the vehicle, a first signal requesting verification of a digital key stored in the memory, in response to determining that the first signal is received from the vehicle at a different time from the time at which control of the vehicle is suppressed:

determine whether an amount of the time-series data of the vibration output by the vibration sensor within a fixed period is equal to or greater than a threshold, and in response to determining that the amount of the time-series data of the vibration output by the vibration sensor within the fixed period is equal to or greater than the threshold, transmit, to the vehicle, a second signal including (i) data indicating a success or failure result of the verification of the digital key and (ii) data indicating an occurrence of the vibration, wherein the second signal, wherein the second signal permits control of the vehicle by the information processing device, and in response to determining that the first signal is received from the vehicle at the time at which control of the vehicle is suppressed, transmit, to the vehicle, a third signal including (i) the data indicating the success or failure result of the verification of the digital key and (ii) data indicating a lack of vibration, without determining whether the amount of the time-series data of the vibration output by the vibration sensor within the fixed period is actually less than the threshold or not, wherein the third signal suppresses control of the vehicle by the information processing device, and provide a notification, on the information processing device, reporting that it is currently the time at which control of the vehicle is suppressed, wherein, when the control of the vehicle using the information processing device is enabled, the vehicle is controlled by the information processing device to perform a function that includes at least one of locking and unlocking of an opening/closing section, turning on a power source, or starting an engine of the vehicle.

8. The information processing device of claim 7, wherein the setting processing is for setting one of activation or deactivation of a setting of the time at which control of the vehicle using the information processing device is suppressed, and a start time and an end time of the time at which control is suppressed.

9. The information processing device of claim 7, wherein the processor is further configured to:

when the vehicle corresponding to the digital key registered in the information processing device is operated within the time period during which control of the vehicle is suppressed, display a message indicating that operation of the digital key is currently prohibited, and allow the user to invalidate the setting of the time period on the information processing device.

10. The information processing device of claim 7, wherein the information processing device is a smartphone.

11. An information processing method, the method being executable by an information processing device including a computer and a vibration sensor that detects a mechanical vibration of the information processing device and outputs time-series data of the vibration of the information processing device, and the method comprising the computer performing processing that includes:

receiving, from a user, setting processing for setting a time at which control of a vehicle using the information processing device is suppressed;

receiving, from the vehicle, a first signal requesting verification of a digital key stored in a memory;

in response to determining that the first signal is received from the vehicle at a different time from the time at which control of the vehicle is suppressed, determining whether an amount of the time-series data of the vibration output by the vibration sensor within a fixed period is equal to or greater than a threshold;

in response to determining that the amount of the time-series data of the vibration output by the vibration sensor within the fixed period is equal to or greater than the threshold, transmitting, to the vehicle, a second signal including (i) data indicating a success or failure result of the verification of the digital key and (ii) data indicating an occurrence of the vibration, wherein the second signal permits control of the vehicle by the information processing device to perform a function that includes at least one of locking and unlocking of an opening/closing section, turning on a power source, or starting an engine of the vehicle;

in response to determining that the amount of the time-series data of the vibration output by the vibration sensor within the fixed period is less than the threshold, transmitting, to the vehicle, a third signal including (i) the data indicating the success or failure result of the verification of the digital key and (ii) data indicating a lack of vibration, wherein the third signal suppresses control of the vehicle by the information processing device, and in response to determining that the first signal is received from the vehicle at the time at which control of the vehicle is suppressed, transmitting the third signal including (i) the data indicating the success or failure result of the verification of the digital key and (ii) the data indicating the lack of vibration, to the vehicle without determining whether the amount of the time-series data of the vibration output by the vibration sensor within the fixed period is equal to or greater than the threshold or is less than the threshold.

12. An information processing method, the method being executable by an information processing device including a computer and a vibration sensor that detects a mechanical vibration of the information processing device and outputs time-series data of the vibration of the information processing device, and the method comprising the computer performing processing that includes:

displaying a screen configured to enable a user to perform setting processing for setting a time at which control of a vehicle using the information processing device is suppressed;

receiving settings according to the setting processing from the user;

receive, from the vehicle, a first signal requesting verification of a digital key stored in a memory, in response to determining that the first signal is received from the vehicle at a different time from the time at which control of the vehicle is suppressed:

determining whether an amount of the time-series data of the vibration output by the vibration sensor within a fixed period is equal to or greater than a threshold, and in response to determining that the amount of the time-series data of the vibration output by the vibration sensor within the fixed period is equal to or greater than the threshold, transmitting, to the vehicle, a second signal including (i) data indicating a success or failure result of the verification of the digital key and (ii) data indicating an occurrence of the vibration, wherein the second signal, wherein the second signal permits control of the vehicle by the information processing device, and in response to determining that the first signal is received from the vehicle at the time at which control of the vehicle is suppressed, transmitting, to the vehicle, a third signal including (i) the data indicating the success or failure result of the verification of the digital key and (ii) data indicating a lack of vibration, without determining whether the amount of the time-series data of the vibration output by the vibration sensor within the fixed period is actually less than the threshold or not, wherein the third signal suppresses control of the vehicle by the information processing device, and providing a notification, on the information processing device, reporting that it is currently the time at which control of the vehicle is suppressed, wherein, when the control of the vehicle using the information processing device is enabled, the vehicle is controlled by the information processing device to perform a function that includes at least one of locking and unlocking of an opening/closing section, turning on a power source, or starting an engine of the vehicle.

13. A non-transitory recording medium storing a program that is executable by a computer equipped with an information processing device and a vibration sensor that detects a mechanical vibration of the information processing device and outputs time-series data of the vibration of the information processing device, to perform processing, the processing comprising:

receiving, from a user, setting processing for setting a time at which control of a vehicle using the information processing device is suppressed;

receiving, from the vehicle, a first signal requesting verification of a digital key stored in a memory;

in response to determining that the first signal is received from the vehicle at a different time from the time at which control of the vehicle is suppressed:

determining whether an amount of the time-series data of the vibration output by the vibration sensor within a fixed period is equal to or greater than a threshold;

in response to determining that the amount of the time-series data of the vibration output by the vibration sensor within the fixed period is equal to or greater than the threshold, transmitting, to the vehicle, a second signal including (i) data indicating a success or failure result of the verification of the digital key and (ii) data indicating an occurrence of the vibration, wherein the second signal permits control of the vehicle by the information processing device to perform a function that includes at least one of locking and unlocking of an opening/closing section, turning on a power source, or starting an engine of the vehicle; and in response to determining that the amount of the time-series data of the vibration output by the vibration sensor within the fixed period is less than the threshold, transmitting, to the vehicle, a third signal including (i) the data indicating the success or failure result of the verification of the digital key and (ii) data indicating a lack of vibration, wherein the third signal suppresses control of the vehicle by the information processing device, and in response to determining that the first signal is received from the vehicle at the time at which control of the vehicle is suppressed, transmitting the third signal including (i) the data indicating the success or failure result of the verification of the digital key and (ii) the data indicating the lack of vibration, to the vehicle without determining whether the amount of the time-series data of the vibration output by the vibration sensor within the fixed period is equal to or greater than the threshold or is less than the threshold.

14. A non-transitory recording medium storing a program that is executable by a computer equipped with an information processing device and a vibration sensor that detects a mechanical vibration of the information processing device and outputs time-series data of the vibration of the information processing device, to perform processing, the processing comprising:

displaying a screen configured to enable a user to perform setting processing for setting a time at which control of a vehicle using the information processing device is suppressed;

receiving settings according to the setting processing from the user;

receiving, from the vehicle, a first signal requesting verification of a digital key stored in a memory, in response to determining that the first signal is received from the vehicle at a different time from the time at which control of the vehicle is suppressed:

determining whether an amount of the time-series data of the vibration output by the vibration sensor within a fixed period is equal to or greater than a threshold, and in response to determining that the amount of the time-series data of the vibration output by the vibration sensor within the fixed period is equal to or greater than the threshold, transmitting, to the vehicle, a second signal including (i) data indicating a success or failure result of the verification of the digital key and (ii) data indicating an occurrence of the vibration, wherein the second signal, wherein the second signal permits control of the vehicle by the information processing device, and in response to determining that the first signal is received from the vehicle at the time at which control of the vehicle is suppressed, transmitting, to the vehicle, a third signal including (i) the data indicating the success or failure result of the verification of the digital key and (ii) data indicating a lack of vibration, without determining whether the amount of the time-series data of the vibration output by the vibration sensor within the fixed period is actually less than the threshold or not, wherein the third signal suppresses control of the vehicle by the information processing device, and providing a notification, on the information processing device, reporting that it is currently the time at which control of the vehicle is suppressed, wherein, when the control of the vehicle using the information processing device is enabled, the vehicle is controlled by the information processing device to perform a function that includes at least one of locking and unlocking of an opening/closing section, turning on a power source, or starting an engine of the vehicle.

* * * * *